US008839669B2

(12) United States Patent
Seibold et al.

(10) Patent No.: US 8,839,669 B2
(45) Date of Patent: Sep. 23, 2014

(54) MEASURING ARRANGEMENT WITH TRANSMISSION CIRCUIT FOR WIRELESS TRANSMISSION OF A MEASURING VALUE

(75) Inventors: Wolfgang Seibold, Tübingen (DE); Thomas Engler, Aichwald (DE); Eugen Hund, Ebersbach (DE)

(73) Assignee: Carl Mahr Holding GmbH, Göttingen (DE)

( * ) Notice: Subject to any disclaimer, the term of this patent is extended or adjusted under 35 U.S.C. 154(b) by 12 days.

(21) Appl. No.: 13/620,777

(22) Filed: Sep. 15, 2012

(65) Prior Publication Data

US 2013/0014579 A1 Jan. 17, 2013

Related U.S. Application Data

(63) Continuation-in-part of application No. PCT/EP2012/055692, filed on Mar. 29, 2012.

(30) Foreign Application Priority Data

Apr. 7, 2011 (EP) ..................................... 11161535

(51) Int. Cl.
*G01D 11/24* (2006.01)
*G01L 19/14* (2006.01)
*G01P 1/02* (2006.01)
*G01B 3/22* (2006.01)
*H04Q 9/00* (2006.01)

(52) U.S. Cl.
CPC .. *G01B 3/22* (2013.01); *H04Q 9/00* (2013.01); *G01B 2210/58* (2013.01); *H04Q 2209/80* (2013.01)
USPC .......................................................... 73/431

(58) Field of Classification Search
USPC .......................................................... 73/431
See application file for complete search history.

(56) References Cited

U.S. PATENT DOCUMENTS

| 4,973,957 | A | 11/1990 | Shimizu et al. |
| 6,526,670 | B1 | 3/2003 | Carli |
| 7,174,268 | B2 | 2/2007 | Katsuki et al. |
| 7,885,610 | B2 * | 2/2011 | Isenmann et al. ............... 455/73 |
| 8,220,324 | B2 * | 7/2012 | Kokubu et al. ............... 73/146.5 |
| 2002/0044050 | A1 * | 4/2002 | Derbyshire et al. .......... 340/442 |
| 2002/0087250 | A1 * | 7/2002 | Pacsai ............................. 701/78 |
| 2008/0211650 | A1 * | 9/2008 | Nakatani et al. .............. 340/447 |
| 2009/0274326 | A1 * | 11/2009 | Jia et al. ......................... 381/311 |
| 2013/0195443 | A1 * | 8/2013 | Yin et al. ......................... 398/25 |

FOREIGN PATENT DOCUMENTS

| CN | 201 364 131 Y | 12/2009 |
| DE | 20 2006 017829 U1 | 2/2007 |
| DE | 10 2006 017243 A1 | 10/2007 |
| GB | 2 406 647 A | 4/2005 |
| GB | 2406647 A * | 4/2005 |
| JP | 7 027501 A | 1/1995 |
| JP | 2010 231566 A | 10/2010 |

* cited by examiner

*Primary Examiner* — Lisa Caputo
*Assistant Examiner* — Jamel Williams
(74) *Attorney, Agent, or Firm* — R. S. Lombard; K. Bach

(57) ABSTRACT

A measuring arrangement in the form of a measuring counter, a measuring slide or a measuring screw. The measuring arrangement comprises a housing in which a measuring unit, a transmission circuit and a receiving circuit are arranged on a common conductor plate. The transmission circuit and the receiving circuit use a common conductor plate antenna which is also provided on the conductor plate. A voltage supply circuit for supplying a voltage to the measuring unit, the transmission circuit and the receiving circuit is also arranged on the conductor plate. Via a measurement value sensor at the housing a measurement value is detected and converted by the measuring unit into an electrical measurement signal and transmitted via the transmission circuit wirelessly to an external central unit.

17 Claims, 3 Drawing Sheets

MEASURING ARRANGEMENT WITH TRANSMISSION CIRCUIT FOR WIRELESS TRANSMISSION OF A MEASURING VALUE

CROSS-REFERENCE TO RELATED APPLICATION

This is a continuation-in-part application of pending international application PCT/EP2012/055692 filed Mar. 29, 2012 and claiming priority of European Patent Application No, 11 161 535.7 filed Apr. 7, 2011.

BACKGROUND OF THE INVENTION

The invention resides in a measuring arrangement which may be in the form of a measuring counter or a measuring gauge. The measuring arrangement may, for example, serve as a length measuring gauge. It includes a housing on which a measuring value sensor or pick-up is arranged. By changing the position of the measuring sensor, an electrical measuring signal is generated in the measuring arrangement. The position of the measuring sensor can be changed by a movement or deformation, for example, a linear displacement or pivot movement. The measuring arrangement may include a display or another indicating device on which the measured value corresponding to the measuring signal may be provided for the operator. Such measuring arrangements have been known for a long time.

DE 10 2006 017 243 A1 disclosed a transmission-receiving apparatus for the transmission of portable field apparatus signals. In this way, process-values are transmitted wirelessly by means of a radio interface. In order to avoid a wiring via a field line system on this area of measuring and control devices, the transmitting and receiving apparatus can be connected to the field apparatus interface of a field apparatus for executing a wireless transmission. The transmitting-receiving apparatus can, in a first operating state, record a field apparatus signal at a field apparatus interface and transmit it via a functional interface. As field apparatus signals measuring values are used, for example.

For the connection of a separate transmitting-receiving apparatus as proposed in DE 10 2006 017 243A1 an interface is needed at a field apparatus, that is for example at a measuring arrangement. It has been found that this procedure works well in connection with stationary measuring arrangements. However, by connecting the transmitting and receiving apparatus to measuring arrangements in connection with handheld measuring apparatus which are carried along by an operator and which are used when needed the handling capability is detrimentally affected by the transmitting-receiving apparatus.

It is therefore the object of the present invention to provide a measuring arrangement which is suitable in particular for measuring apparatus such as measuring slides, measuring gauges or length sensors and their handling.

SUMMARY OF THE INVENTION

The object is solved by a measuring arrangement with the features of the claims. The invention concerns a measuring arrangement (10) in the form of a measuring counter, a measuring slide or a measuring screw. The measuring arrangement (10) comprises a housing (11) in which a measuring unit (14), a transmission circuit and a receiving circuit are arranged on a common conductor plate (22). The transmission circuit (19) and the receiving circuit use a common conductor plate antenna (21) which is also provided on the conductor plate (22). A voltage supply circuit (30) for supplying a voltage to the measuring unit (14), the transmission circuit and the receiving circuit is also arranged on the conductor plate (22). An interface between the measurement unit and the transmission circuit, or respectively, the receiving circuit arranged outside the housing is therefore not needed. With the common voltage supply circuit (30) the installation space for the complete circuit arrangement is relatively small. The housing (1) of the measuring arrangement (10) can easily be sealed and consequently easily be in the form of the needed protective housing. Via a measurement value sensor (12) at the housing (11) a measurement value is detected and converted by the measuring unit (14) into an electrical measurement signal and transmitted via the transmission circuit wirelessly to an external central unit (20).

In accordance with the invention, the measuring arrangement comprises an electrical and/or electronic measuring circuit which is designed to form an electric measuring signal from the position of the measuring value sensor an electrical measuring signal. Preferably, the measuring arrangement includes an acoustic and/or optical transmission unit, for example, a display via which a measuring value corresponding to the measuring signal can be shown to the operating person. For storing and processing the measuring signal can be transmitted in a wireless way, preferably by radio, to a central unit. To this end, a transmitting circuit is provided which is suitable to receive the measuring signal from the measuring circuit and to generate therefrom a measurement transmission signal which can be transmitted wirelessly from the central unit. The transmission circuit, as well as the measuring circuit, is arranged in the common housing of the measuring arrangement, preferably on a common conductor plate. In a preferred embodiment the antenna of the transmission circuit is also arranged within the housing and preferably in the form of a conductor plate antenna or a SMD antenna. In this way a compact arrangement with little space requirements for the measuring arrangement is obtained whereby the handling and operation by operating personnel is improved. The measurement arrangement can transmit measuring values wirelessly. An external transmission device or, respectively, an external antenna are not present and, consequently, do not detrimentally affect the handling of the measuring arrangement.

Furthermore, there is no externally accessible interface between the measuring circuit and the transmission circuit This has the advantage that the housing can be of a dust and/or water tight design. It is also possible, if necessary, to omit any wire interface and to provide the wireless interface via the transmission circuit which is present within the housing.

In a preferred embodiment, the transmission circuit and the measuring circuit are provided with a common voltage supply circuit disposed within the housing. The voltage supply circuit includes an energy store, for example, a battery or rechargeable accumulator. This energy storage device serves as a voltage supplier for the transmission circuit as well as a voltage supplier for the measuring circuit. The voltage supply circuit may be arranged in a particular on a conductor plate which is common to the transmission circuit and/or the measuring circuit There is therefore no duplicate voltage supply for the measuring circuit and the transmission circuit which saves installation space and permits the arrangement of all components in a space-saving manner in a common housing. Since there is only a single energy store for the voltage supply a single closeable opening in the housing for the exchange of the energy store is needed so that the housing can be correspondingly simple and secure.

In an advantageous embodiment, a first supply line of the voltage supply circuit which is connected to the transmission circuit is directly attached to the supply voltage. Herein, a second supply line may be connected to the supply voltage via a resistor. It is advantageous in this connection, if the second supply line is connected via a condenser to ground. The condenser buffers the supply voltage for the measuring circuit which is connected to the second supply line. With this arrangement, it is ensured that voltage variations, which are caused by the transmission circuit during transmission periods to do essentially affect the supply voltage in the second supply line which could detrimentally affect or falsify the measuring signal. It is made sure in this way, that the correct measurement value is obtained by the measuring signal and transmitted to the transmission circuit via a communication interface location.

The transmission circuit transmits preferably at a frequency of 2.4 GHz which makes a license-free operating of the measuring arrangement possible. The transmission operation may be indicated on the display device of the measuring arrangement.

The measuring arrangement may also include a receiving circuit which may be established in particular together with the transmission circuit as an integrated transmission and receiving circuit with a common antenna. It is advantageous if the central unit acknowledges the complete and/or correct reception of the data by an acknowledgement signal which can be received in the measuring arrangement by a receiving circuit. The acknowledgement signal received by the measuring arrangement may be issued optically or acoustically, for example, it may be indicated by an information on the display unit, so that the operator can determine whether the measuring values have been transmitted completely, or respectively, correctly or not.

The measuring arrangement may further include an address store for storing an address assigned to the measuring arrangement. This address is preferably part of the measurement value transmission signal so that the central unit receiving the measurement value transmission signal can assign the measurement value to a certain measuring arrangement. The address of the measurement arrangement is preferably determined by the central unit and is variable. Upon initializing the address may be transmitted by the central unit, and, upon reception in the receiving circuit, deposited in the address store. In this way, fixed determination of the address are not necessary nor are input means for entering the address directly into the measuring arrangement. In this way a system is obtained which is very flexible in its use. One or several measuring arrangements can communicate in a very simple manner with a common central unit as a result of the variable address.

BRIEF DESCRIPTION OF THE DRAWINGS

Advantageous embodiments of the measuring arrangement are apparent from the drawings as well as the description. The description is limited to the essential features of the invention and describes a preferred exemplary embodiment with reference to the accompanying drawings. It is shown in FIG. 1 is a highly schematic view of a measuring arranger and a central unit.

DETAILED DESCRIPTION OF THE PARTICULAR EMBODIMENTS

Figure 1:
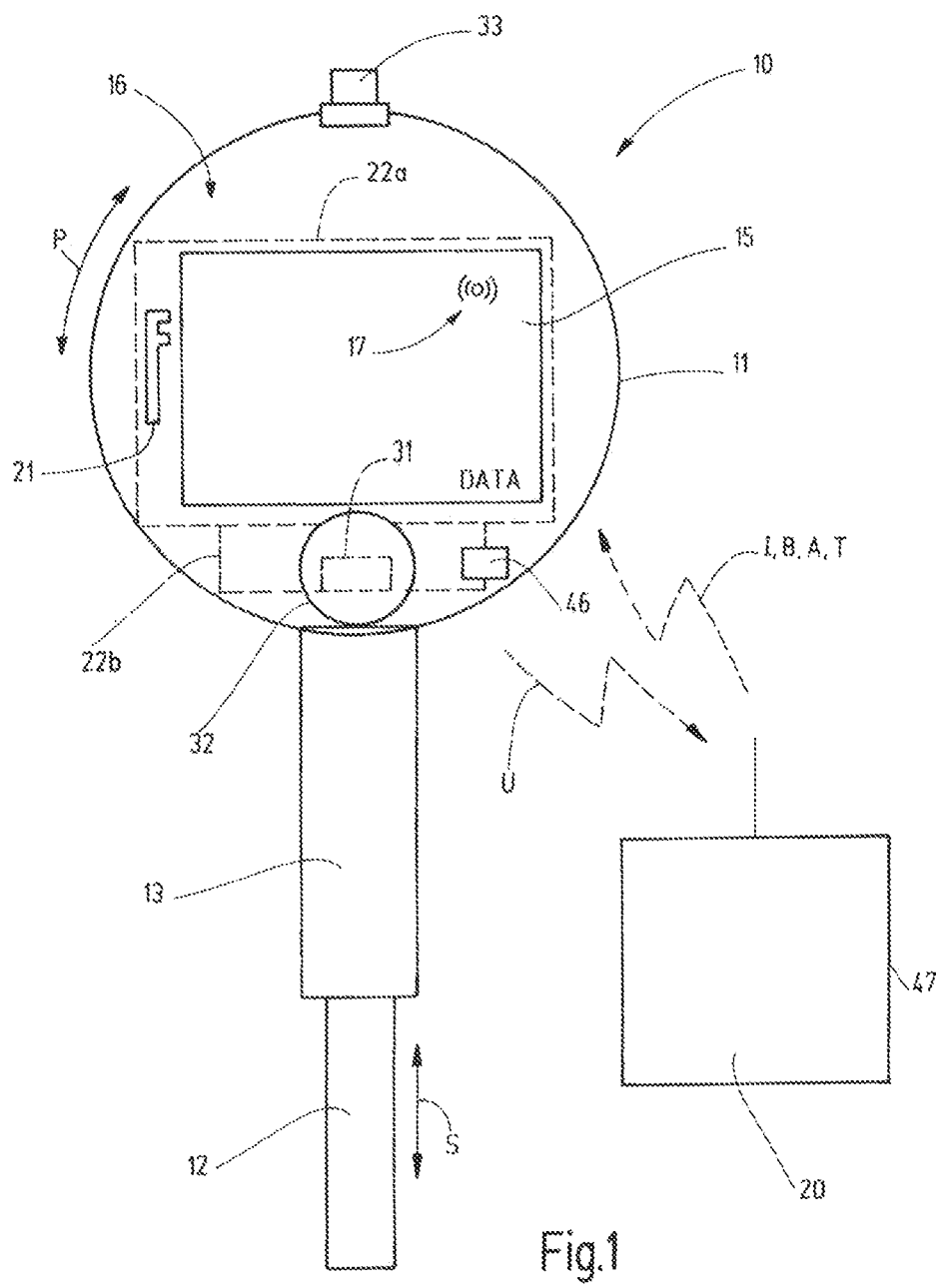

FIG. 1 shows schematically a measuring arrangement 10 in the form of a measuring tube. The measuring arrangement 10 comprises a housing 11 from which a measuring value sensor 12 extends. In the exemplary embodiment the measuring value sensor 12 is supported on a housing 11 in a guide structure 13 so as to be linearly slidable. With aid of the measuring value sensor 12 a position change of a work piece can be detected. Based on the position S of the measuring value sensor 12, an electric measuring signal M (FIG. 2) is generated in a measuring circuit 14 of the measuring arrangement 10. To this end, the measuring circuit is connected to the display device 15 via a communication interface 18. The display device 15 is, for example, a monochromatic liquid crystal display (LCD), in particular a so-called TN-LCD, i.e., twisted nematic LCD or HTN-LCD, i.e., high twisted nematic LCD. In the exemplary embodiment, the display device 15 is arranged in a rotatably supported housing part 16 so that, depending on the position of the measunng arrangement 10, the operator can adjust the position of the display device 15 in such a way that the numbers and/or letters and/or symbols are oriented vertically and are not upside down or turned sideward, whereby the reading of the measurement values is more convenient. The axis of rotation extends normal to the surface of the display device 15, this rotatability of the housing part 16 is indicated by an arrow P.

Such measuring arrangements 10 are often used in dusty or moist environments. In the exemplary embodiment the housing is therefore dust-protected or dust-tight. In addition, it may be water-tight.

The change of the position S of the measuring value sensor 12 may differ from the exemplary embodiment described; it may be determined by a pivot movement or a deformation of the measuring value sensor 12. The measuring arrangement 10 maybe different from the sensor shown herein—and be in the form of a measuring slide, such as a caliper, or a measuring screw, such as a micrometer.

Figure 2:
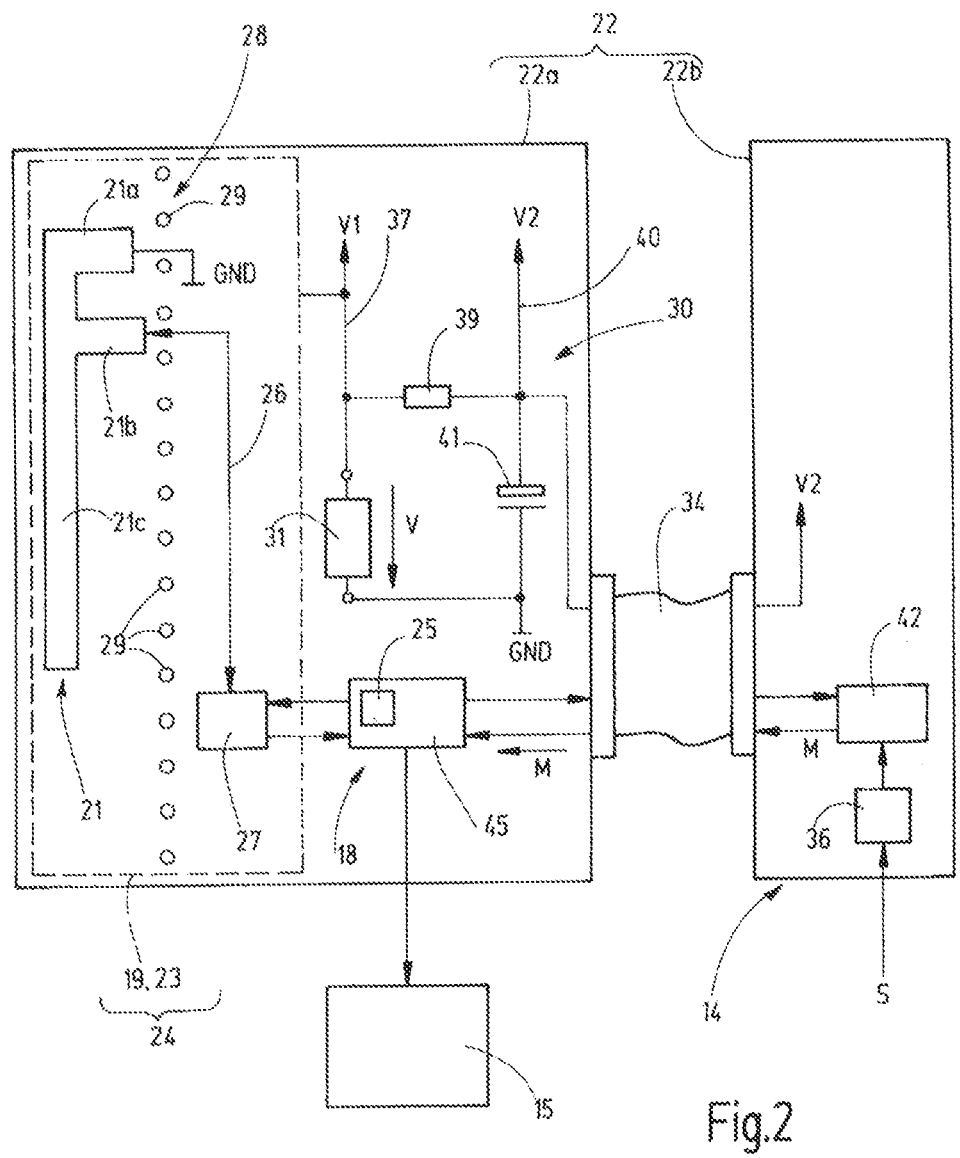
FIG. 2 is a block diagram like representation of a measuring circuit, a transmission and receiving circuit as well as a voltage supply circuit of the measuring arrangement.

By way of the communication interface 18, which may for example, be in the form of a control unit 45, the measuring circuit 14 is electrically connected to a transmission circuit 19. The communication interface 18 provides for a transmission of the measuring signal M from the measuring circuit 14 to the transmission circuit 19 (FIG. 2). The transmission circuit 19 serves as wireless interface of the measuring arrangement 10 to a central unit 20. The transmission circuit 19 generates on the basis of the measuring signal M, a transmission signal 11, which is transmitted to the central unit 20 in a wireless way. To this end, the transmission circuit 19 includes an antenna 21. The antenna 21 is arranged in the housing 11 of the measuring arrangement 10 and, in the exemplary embodiment, is in the form of conductor plate antenna, that is, it is in the form of a copper strip antenna 21 which is printed onto a conductor plate 22 and which in the exemplary embodiment is in the form of an F-antenna. The conductor plate antenna 21 comprises two parallel legs 21a and 21b which are connected to a longitudinal section 21C extending transverse to the parallel legs. The first leg 21a arranged at one end of the longitudinal section 21c is electrically connected to the ground GND and the other, second, leg 21b is connected, via an antenna line 26 to a transmission control unit 27.

Alternatively, the antenna could be in the form of a SMD-antenna mounted onto the conductor plate 22.

Parallel to the longitudinal section 21c of the antenna 21, in the area of the ends of the two legs 21a, 21b a shielding arrangement 28 is provided which shields the antenna from an undesired in-coupling of high-frequency signals of the measuring circuit 14 and the transmission circuit 19. This is particularly important since the measuring circuit 14 connects analog signals to digital signals whereby superimposing waves of high frequency can develop. The shielding arrangement 28 is formed in the exemplary embodiment by a series of through-contacts 29 which extend through the conductor plate 22 and interconnect all the ground locations of the conductor plate 22. The series of through-contacts 29 extends preferably over the full length of the conductor plate 22 in the direction of the longitudinal section 21c.

The measuring arrangement 10 includes for example, also a receiving circuit 23. The receiving circuit 23 uses the same antenna 21. In the exemplary embodiment the transmission circuit 19 and the receiving circuit 23 are integrated into a first transmission and receiving circuit 24. The transmission and receiving circuit 24 consequently represents a bi-directional wireless interface to the central unit 20 and can transmit the transmission signal U and also receive signals from the central unit 20, for example, an initializing signal I. The central unit 20 desirably includes a second transmission and receiving circuit 47.

The initializing signal I serves to assign to the measuring arrangement 10 an address when the measuring arrangement 10 is connected to the central unit for the first time. The address is issued by the central unit 20. The measuring arrangement 10 includes an address store 25 in which the address received with the initializing signal I is stored. The address is transmitted with the transmission of the transmission signal U together with the measuring value so that the central unit 20 can assign the measuring value to a certain measuring arrangement 10. In this way, several measuring arrangements 10 can be wirelessly connected to a common central unit 20. The addresses which are issued by the central unit 20 upon initialization remains the same up to a new initialization. Before a new issue of an address for a measuring arrangement 10, the original address must be deleted by an operator. Only then is the central unit 20 capable of issuing a new address. It is also possible that a new initialization is performed during operation, for example, if additional measuring arrangements 10 are connected to the central unit 20 or presently active measuring arrangements 10 are to be disconnected.

The transmission operation of the measuring arrangement is indicated to be operating during the transmission of the transmission signal U on the display device 15, for example, by a symbol 17 as it is shown in FIG. 1, for example. When the central unit 20 has received the transmission signal U it acknowledges the receipt by an acknowledgement signal B. As soon as the receiving circuit 23 or respectively the transmission and receiving circuit 24 has received the acknowledgement signal B, the receipt is indicated on the indicating device of the operator. In the exemplary embodiment, this occurs by displaying the Term "Data" on the indicating device 15. It is obvious, that the display of any symbols terms, pictograms or similar is suitable to indicate the transmission operation and/or the receipt of the acknowledgement signal B. Additionally or alternatively also acoustic signals may be used. In the exemplary embodiment however, this is not provided because the housing is to be of a dust and water-proof design. In this case, protection can be provided more easily and reliably on exclusively optical display.

Figure 3:
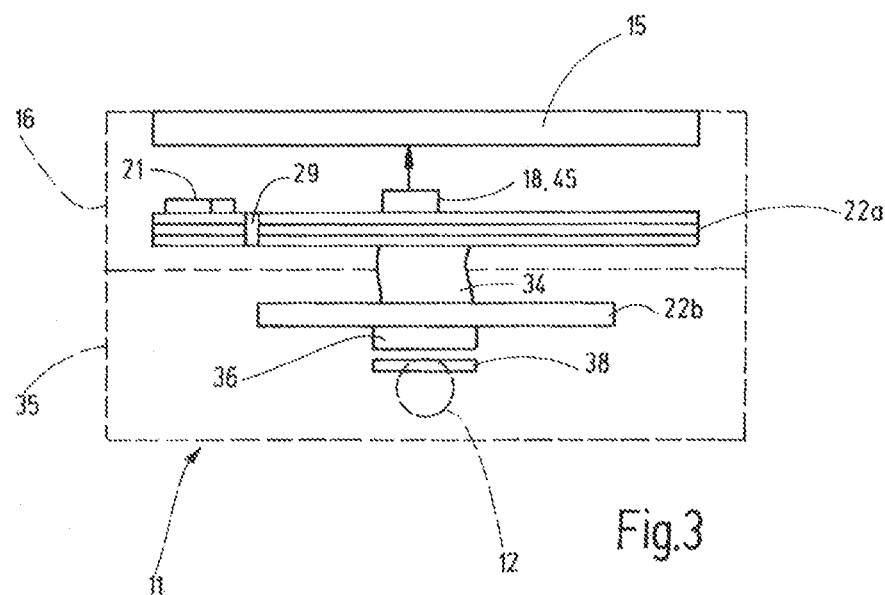
FIG. 3 is a schematic block-diagram-like representation of the arrangement of the circuits of FIG. 2 in the housing of the measuring arrangement; and, FIG. 4 is the time-based sequence of transmitting the transmission signal following the receipt of a time synchronization signal.

For supplying electric energy to the measuring unit as well as to the transmission and receiving circuit 24, a voltage supply circuit 30 is provided to which the measuring unit 14 as well as the transmission and receiving circuit 24 is connected. The voltage supply circuit 30 includes an energy store 31 which is in particular in the form of a battery or a rechargeable accumulator. The energy store 31 is the only energy source for the measuring arrangement 10 and provides a supply voltage V. The voltage supply circuit 30 is arranged in the preferred exemplary embodiment together with the transmission and receiving circuit 24 on the first conductor plate part 22a of the conductor plate 22. The measuring unit 14 is arranged on the second conductor plate part 22b of the conductor plate 22, the two conductor plate parts 22a, 22b being electronically interconnected via a flexible connecting cable 34. The conductor plate 22 is arranged in the housing 11 of the measuring arrangement 10 Here, the first conductor plate part 22a is arranged below the display device 15 within the rotatable housing part 16 so as to be movable together with the rotatable housing part 16. The second conductor plate part 22b is arranged together with the measuring unit 14 is arranged in a base part 35 of the housing 11 on which also the guide structure 13 is provided. The housing part 16 can be rotated relative to the base part 35 in the direction of the arrow P (FIG. 1). The second conductor plate part 22b remains stationary in the base part 35 when the housing part 16 is rotated relative to the base part 35 (FIG. 3).

The measuring circuit 14 includes a sensor 36 which is for example an inductive sensor 36 and which detects the position of a measuring rod 38 and which transfers the sensor signal to a measuring central unit 42. The measuring stick 38 is a component of the measuring value sensor 12 so that in addition to the position of the measuring value sensor 12 also the position of measuring stick 38 is changed and detected by the sensor 36. A measuring signal M corresponding to the sensor signal may be transmitted by the measuring control unit 42 via the communication interface 18 or, respectively, the control unit 45 to the transmission and/or receiving circuit 30 only via a battery opening 32 for exchanging the battery or, respectively the accumulator. If instead of a disposable battery, a rechargeable battery or accumulator is provided, the battery opening 32 may be omitted and a cable connection 33 may be provided which is accessible from the outside. The cable connection 33 may then be used for connecting the measuring arrangement 10 to a charging device and/or also for a cable-based transmission of the measuring signal M to the central unit 20 or another participant.

FIG. 2 shows a block diagram of the voltage supply circuit 30. A first supply line 37 connects the transmission and receiving circuit 24 directly to the energy store 31. To the first supply line 37 a first voltage V1 is applied. The first supply line 37 is electrically connected to a second supply line 40 via a resistor 39. The second supply line 40 is connected to the measuring unit 14. In addition, the second supply line 40 is connected via a condenser 41 to ground GND. To the second supply line 40, a second voltage V2 for the measuring unit 14 is applied.

By means of the voltage supply circuit 30, it is ensured that the measuring signal M can be detected also during the transmission of the transmission signal U without being affected thereby. Since the supply voltage V of the energy store 31 is applied directly to the supply line 37, a short term voltage drop of the first voltage V1 may occur during the transmission of the transmission signal V1. The second voltage V2 for the measuring unit 14 is buffered by the condenser 41 and maintains the necessary voltage value of the second voltage V2 during voltage variations of the first voltage V1 for a certain period. This may result in a reduction of the charge of the condenser 41. The condenser 41 is later again fully recharged by a charging current via the resistor 39.

In the preferred exemplary embodiment a common control unit 45 is assigned to the measuring unit 14 as well as the transmission and receiving circuit 24. The control unit 45 may be, for example, a microcontroller μC. Via the control unit 45, the operation of the measuring unit 14 as well as the transmission and receiving circuit 24 is controlled or, respectively coordinated. The control unit 45 also includes an address store 25.

The measuring arrangement 10 may be placed into a first state of rest and, preferably, also into a second state of rest for extending the life of the battery. Below the transfer protocol and the two states of rest well be explained.

Figure 4:
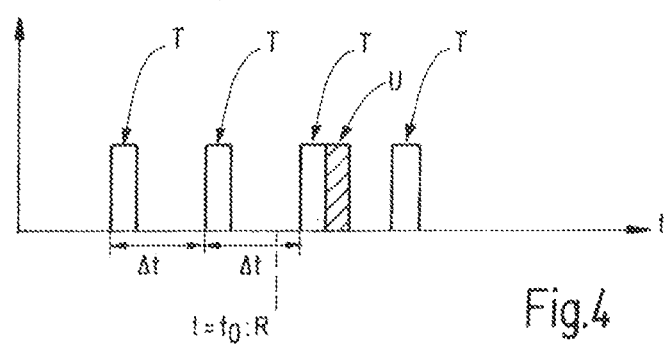

The transmission control unit 27 or, respectively, the transmission and receiving circuit 24 is synchronized in a predetermined time interval Δt, for example, every 250 ms, with the central unit 20. The synchronization serves to adapt the time cycle of the measuring arrangement 10 to the time cycle of the central unit 20 in order to prevent deviations. Herein, the transmission and receiving circuit 24 receives only a time synchronization signal T if no transmission demand is present. If a transmission demand R is present (in FIG. 4, for example, at the time $t=t_o$), immediately following the receipt of the time synchronization signal T, the transmission signal U is transmitted, that is the address of the measuring arrangement 10 together with the measurement value, to the central unit 20. Outside this fixed predetermined time cycle with the time interval Δt no signal transmission is initiated by the measuring arrangement 10. The transmission control unit 27 or, respectively, the transmission and receiving circuit 24 are between the synchronization and transmission time windows in the first state of rest as long as this first state of rest is not interrupted by a transmission demand R. The drive synchronization signal T may be the same for all measuring arrangements 10 connected to the central unit 20 or it may be provided via the address for a certain measuring arrangement 10. In this case, time intervals Δt of different length and different transmission times may be assigned to the measuring arrangements 10.

This first state of rest of the transmission control unit 27 or, respectively, the transmission and receiving circuit 24 is terminated by the control unit 45 when a transmission demand R is present. This is, for example, the case when the measurement signal M changes or when with the time synchronization signal T a demand signal A is received by the central unit 20, or when a data key 46 of the measuring arrangement 10 is activated by an operator. By the sending of a demand signal A, the measuring arrangement 10 is caused to transmit the currently present measuring signal M by transmitting the transmission signal U. The demand signal A includes the address of the measurement arrangement 10 whose measurement value is requested. In the control unit 45 the received address is compared with the address of the measuring arrangement deposited in the address store 25 and a transmission signal U is transmitted at the next possible point in time, but only if the two addresses correspond.

By way of the control unit 45, the momentary measurement value M is requested by the measurement control unit 47 at regular time intervals. If during a predetermined time interval the measurement value does not change and there is no other transmission request R the control unit switches to a second state of rest in which the normal measurement value reporting routine is switched off. In this second state of rest also the measuring control unit 42 is in the state of rest. As soon as the measuring signal M changes or another transmission request R is present, the second state of rest is terminated.

It is also possible for the control unit 45 to initiate the transmission of the transmission signal U at predetermined time intervals. If the transmission signal is sent at regular time intervals the acknowledgement of the transmission by an acknowledgement signal may be omitted.

The bi-directional transmission occurs preferably in a coded manner so that unauthorized people have no access to the transmitted data. To this end, a private code is additionally deposited in the central unit 20 and in the measurement arrangement 10. Only data which can be decoded with this private code by the transmission control unit 27 are transmitted by the transmission control unit 27. Otherwise the data received cannot be processed. In this way, a maximum data protection is achieved.

The invention concerns a measuring arrangement 10 in the form of a measuring counter, a measuring slide or a measuring screw. The measuring arrangement 10 includes a housing 11 in which a measuring circuit 14, a transmission circuit 19 and a receiving circuit 23 are arranged on a common conductor plate 22. The transmission circuit 19 and the receiving circuit 23 use a common conductor plate antenna 21 which is also provided on the conductor plate 22. Furthermore, a voltage supply circuit 30 for supplying a voltage to the measuring circuit 14, the transmission circuit 19 and the receiving circuit is arranged on the conductor plate 22. An interface between the measuring circuit 14 and the transmission circuit 19 or, respectively the receiving circuit 23, which interface is disposed outside the housing 11 is therefore not needed. With the common voltage supply circuit 30, the installation space for the complete circuit arrangement is reduced. The housing can be sealed in a simple manner and can be designed in the necessary housing protection. Via a measuring value sensor 12 at the housing 11 a measurement value is detected, is converted by the measurement circuit 14 to an electrical measurement signal M and is transmitted wirelessly via the transmission circuit 19 to an external central unit 20.

LISTING OF THE REFERENCE NUMERALS 10 measuring arrangement
11 housing
12 measuring value sensor
13 guide structure
14 measuring unit
15 display device
16 housing part
17 symbol
18 communication interface
19 transmission circuit
20 central unit
21 antenna
21a first leg
21b second leg
21c longitudinal section
22 conductor plate
22a first conductor plate part
22b second conductor plate part
23 receiving circuit
24 first transmission and receiving circuit
25 address store
26 antenna line
27 transmission control unit
28 shielding arrangement
29 through-contact
30 voltage supply circuit 31 energy store
32 battery opening
33 cable connection
34 connecting cable
35 base part
36 inductive sensor
37 first supply line
38 measuring rod
49 resistor
40 second supply line
41 condenser
42 measuring control unit
45 control unit
46 data key
47 second transmission and receiving circuit
A demand signal
B acknowledgement signal
I initializing signal
M measuring signal
P arrow
S position of the measuring value sensor
T time synchronization signal
U transmission signal
V supply voltage
V1 first voltage
V2 second voltage

What is claimed is:

1. Measuring arrangement (10) including:
a housing (11) on which a measurement value sensor (12) is arranged whose position (S) is adjustable,
a measurement unit (14) arranged in the housing (11) for generating an electric measurement signal (M) depending on the position of the measurement value sensor (12),
a transmission circuit (19) which is arranged in the housing (11) and which is connected via a communication interface (18) to the measurement unit (14),
the transmission circuit (19) being equipped to transmit a transmission signal U corresponding to the electrical measurement signal M wirelessly to a central unit (20),
the transmission circuit (19) and the measuring unit (14) have a common control unit (45), the control unit (45) is adapted to place the transmission circuit (19) and/or the measuring unit (14) into a state of rest with reduced energy needs.

2. Measuring arrangement according to claim 1, characterized in that a voltage supply circuit (30) including an energy store (31) is provided to which the transmission circuit (19) as well as the measurement unit (14) are connected.

3. Measurement arrangement according to claim 2, characterized in that a first supply line (37) which is connected to the transmission circuit (19) is connected directly to energy store (31) to receive the supply voltage (V) from the voltage supply circuit (30).

4. Measurement arrangement according to claim 2, characterized in that a second supply line (40) which is connected to the measurement unit (14) is connected to the supply voltage (V) of the voltage supply circuit (30) via a resistor (39) and via a condenser (41) to ground (GND).

5. Measurement arrangement according to claim 4, characterized in that the resistor (39) is connected directly to the supply voltage (V).

6. Measurement arrangement according to claim 1, characterized in that the measuring arrangement (10) is operatively arranged for a length measurement.

7. Measurement arrangement according to claim 1, characterized in that the housing (11) is dust-protected or dust-tight and/or water tight.

8. Measurement arrangement according to claim 2, characterized in that the transmission circuit (19) includes an antenna (21) arranged in the housing (11) for operatively providing a wireless interface between the measuring arrangement (10) and the central unit (20).

9. Measurement arrangement according to claim 8, characterized in that the antenna (21) is in the form of a conductor plate antenna or a SMD-antenna.

10. Measurement arrangement according to claim 1, characterized in that an address store (25) is provided for storing an address assigned to the measurement arrangement (10).

11. Measurement arrangement according to claim 1, characterized in that a receiving circuit (23) is provided especially in a form in which it is integrated with the transmission circuit (19) providing for a transmission and receiving circuit (24) arranged in the housing (11).

12. Measurement arrangement according to claim 10, characterized in that wherein the address is received by the receiving circuit (23) and deposited in the address store (25).

13. Measurement arrangement according to claim 10, characterized in that the transmission circuit (19) is adapted to transmit the address of the measuring arrangement (10) together with the transmission signal U to the central unit (20).

14. Arrangement comprising:
at least one measuring arrangement (10) including a housing (11) on which a measurement value sensor (12) is arranged whose position (S) is adjustable, a measurement unit (14) arranged in the housing (11) for generating an electric measurement signal (M) depending on the position of the measurement value sensor (12), a transmission circuit (19) which is arranged in the housing (11) and which is connected via a communication interface (18) to the measurement unit (14), the transmission circuit (19) being equipped to transmit a transmission signal U corresponding to the electrical measurement signal M wirelessly to a central unit (20), a receiving circuit (23) is provided especially in a form in which it is integrated with the transmission circuit (19) providing for a first transmission and receiving circuit (24), an address store (25) is provided for storing an address assigned to one of the at least one measurement arrangements (10,
a central unit (20) including a second transmission and receiving circuit (47) for the wireless communication with the at least one measurement arrangement (10), wherein the central unit (20) is arranged to assign to the at least one measurement arrangement (10) an address during an initialization signal (I), and,
the first transmission and receiving circuit (24) of the at least one measuring arrangement (10) is synchronized in a predetermined time interval Δt with the central unit (20).

15. Measuring arrangement according to claim 1, further comprising a display device (15) operatively arranged on the housing (11) for providing visual signals to an operator, the display device (15) connected via the communication interface (15) to the measurement unit (14).

16. Measuring arrangement according to claim 8, further comprising a shielding arrangement (28) for operatively shielding the antenna (21) from undesired in-coupling of high frequency signals of the measuring circuit (14) and the transmission circuit (19).

17. Measuring arrangement according to claim 1, wherein the measuring circuit (14) further includes a measuring central unit (42) in operative communication with the control unit (45) and a sensor (36) for detecting the position of a measuring rod (38) and generating a sensor signal indicative of the position of the measuring rod (38) to the measuring central unit (42).

\* \* \* \* \*